(12) United States Patent
Wilks

(10) Patent No.: US 6,494,426 B1
(45) Date of Patent: Dec. 17, 2002

(54) MOUNTING SYSTEM

(76) Inventor: Leroy Wilks, 230 Jason Dr., Sarasota, FL (US) 34238

( * ) Notice: Subject to any disclaimer, the term of this patent is extended or adjusted under 35 U.S.C. 154(b) by 0 days.

(21) Appl. No.: 09/938,231

(22) Filed: Aug. 23, 2001

(51) Int. Cl.⁷ .................................................. F16L 3/08
(52) U.S. Cl. ............................ 248/222.14; 248/222.11; 248/251; 248/231.9
(58) Field of Search ................................. 248/251, 250, 248/222.14, 222.52, 231.9, 231.91; 403/221.11, 267, 266, 296

(56) References Cited

U.S. PATENT DOCUMENTS

| | | | | |
|---|---|---|---|---|
| 2,886,278 A | * | 5/1959 | Opie | ........................ 248/251 |
| 4,979,713 A | * | 12/1990 | Bell | ....................... 248/221.11 |
| 5,544,865 A | * | 8/1996 | Abbaticchio | ............. 256/65.08 |
| 5,730,413 A | * | 3/1998 | Chen | ........................... 248/303 |
| 5,788,224 A | * | 8/1998 | Platt | ............................. 256/19 |
| 5,881,983 A | * | 3/1999 | Hofmann et al. | ......... 248/176.1 |
| 6,305,447 B1 | * | 10/2001 | Rousseau | .................. 144/135.2 |

* cited by examiner

Primary Examiner—Anita King

(57) ABSTRACT

A mounting system comprises a generally cylindrical mounting plate. The mounting plate has an outer circumference. The outer circumference has a plurality of concave regions and a plurality of convex regions between the concave regions. The convex regions each have male threads. The male threads are adapted to releasably couple to the internal threads of a cylindrical member. At least one hole is provided through the mounting plate.

8 Claims, 4 Drawing Sheets

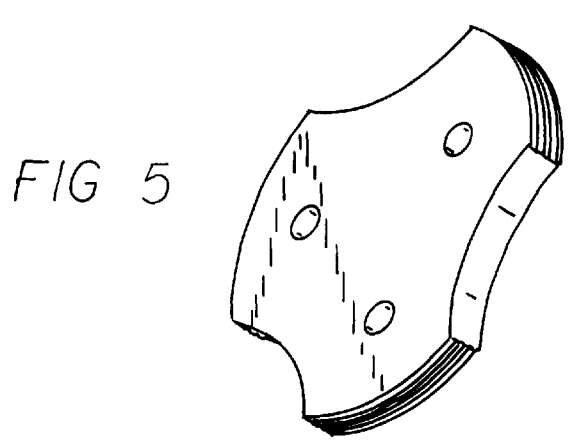
FIG 5
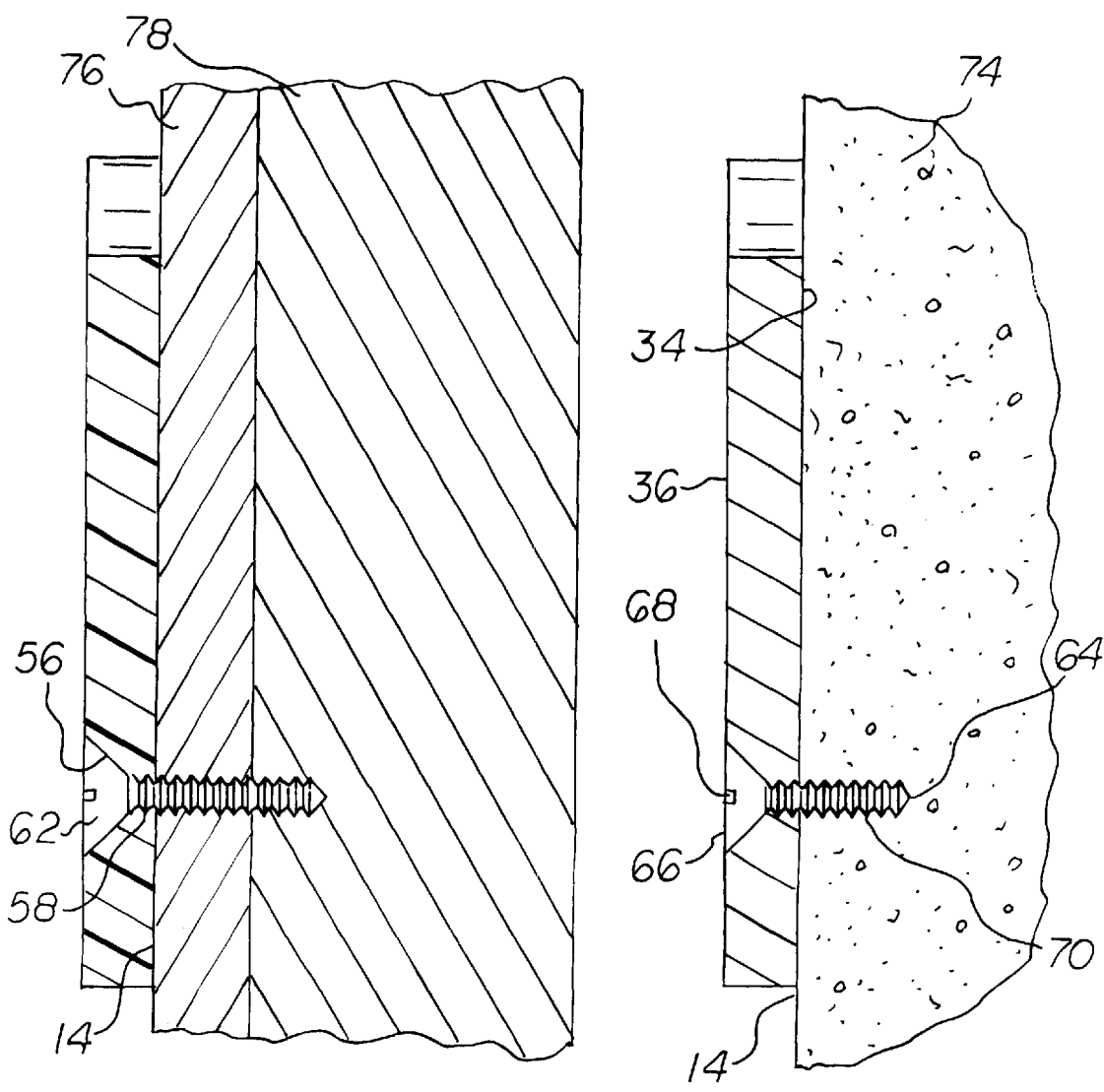
FIG 4
FIG 3

FIG 8
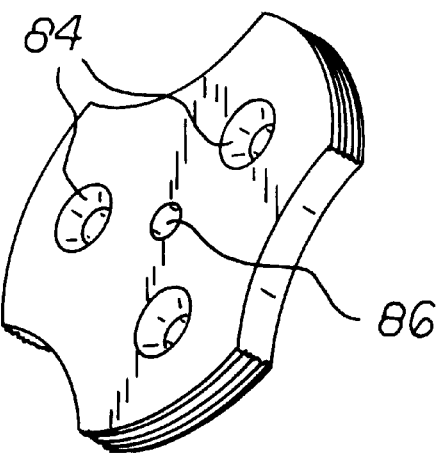
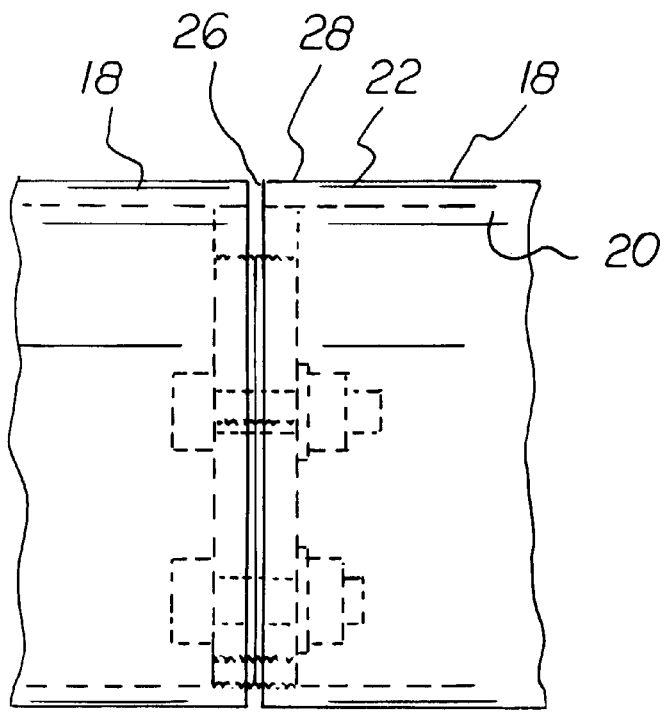
FIG 7
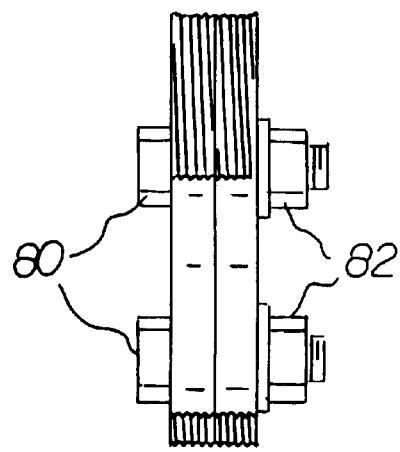
FIG 6

MOUNTING SYSTEM

BACKGROUND OF THE INVENTION

1. Field of the Invention

The present invention relates to a mounting system and more particularly pertains to coupling internally threaded cylindrical members including rods, pipes and tubes to flat surfaces and to each other.

2. Description of the Prior Art

The use of coupling devices of conventional designs and configurations is known in the prior art. More specifically, coupling devices of conventional designs and configurations previously devised and utilized for the purpose of joining items of hardware through known methods and apparatuses are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a mounting system that allows coupling internally threaded cylindrical members including rods, pipes and tubes to flat surfaces and to each other.

In this respect, the mounting system according to the present invention substantially departs from the conventional concepts and designs of the prior art, and in doing so provides an apparatus primarily developed for the purpose of coupling internally threaded cylindrical members including rods, pipes and tubes to flat surfaces and to each other.

Therefore, it can be appreciated that there exists a continuing need for a new and improved mounting system which can be used for coupling internally threaded cylindrical members including rods, pipes and tubes to flat surfaces and to each other. In this regard, the present invention substantially fulfills this need.

SUMMARY OF THE INVENTION

In view of the foregoing disadvantages inherent in the known types of coupling devices of conventional designs and configurations now present in the prior art, the present invention provides an improved mounting system. As such, the general purpose of the present invention, which will be described subsequently in greater detail, is to provide a new and improved mounting system and method which has all the advantages of the prior art and none of the disadvantages.

To attain this, the present invention essentially comprises a vertically oriented, rigid, planar, recipient surface. A cylindrical member is provided. The cylindrical member has an interior surface and an exterior surface. The cylindrical member further has a first end. The first end has a first edge. The first end also has female threads. The female threads are formed in the interior surface adjacent to the first edge. A mounting plate is provided next. The mounting plate has an interior face and an exterior face. The mounting plate has a generally cylindrical, thin, outer circumference. The circumference of the mounting plate has three arcuate concave regions. Each region is about 60 degrees, equally spaced around the circumference. The circumference of the mounting plate has three arcuate convex regions. Each region is about 60 degrees, equally spaced around the circumference between the concave regions. The convex regions each have male threads. The male threads are adapted to releasably couple to the threads of the cylindrical member. The mounting plate further has a central extent with three beveled holes symmetrically located adjacent to the circumference in proximity to the convex regions. The beveled holes have a large aperture opening in the exterior face of the mounting plate and a small aperture opening in to the interior face of the mounting plate. The interior face is adapted to lie flush with the recipient surface. One of the three concave regions is adapted to be positioned at the upper most extent of the recipient surface. In this manner the adjacent edges of the convex regions lie laterally spaced when coupled to the planar surface such that their adjacent edges lie in a horizontal plane for supporting a level.

Provided last are three set screws. Each screw has a pointed end and a head end. Each screw also has a flared top portion. The flared top portion has a coupling recess and male threads there between. The screws are adapted to threadedly couple through the mounting plate into the recipient surface. In this manner the pointed end and threads pierce the planar surface and the head end lies within the beveled holes with the flared top portion lying flush with the top face of the mounting plate. The mounting plate may then threadedly receive and support the cylindrical member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mounting system which has all of the advantages of the prior art coupling devices of conventional designs and configurations and none of the disadvantages.

It is another object of the present invention to provide a new and improved mounting system which may be easily and efficiently manufactured and marketed.

It is further an object of the present invention to provide a new and improved mounting system which is of durable and reliable constructions.

An even further object of the present invention is to provide a new and improved mounting system which is susceptible of a low cost of manufacture with regard to both materials and labor, and which accordingly is then susceptible of low prices of sale to the consuming public, thereby making such mounting system economically available to the buying public.

Even still another object of the present invention is to provide a mounting system for coupling internally threaded cylindrical members including rods, pipes and tubes to flat surfaces and to each other.

Lastly, it is an object of the present invention to provide a new and improved mounting system comprising a generally cylindrical mounting plate. The mounting plate has an outer circumference. The outer circumference has a plurality of concave regions and a plurality of convex regions between the concave regions. The convex regions each have male threads. The male threads are adapted to releasably couple to the internal threads of a cylindrical member. At least one hole is provided through the mounting plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the mounting plate taken along line 3—3 of FIG. 2 coupled to a concrete wall.

FIG. 4 is a cross sectional view of the mounting plate taken along line 3—3 of FIG. 2 coupled to wall board.

FIG. 5 is a perspective showing of a mounting system constructed in accordance with an alternate embodiment of the invention.

FIG. 6 is a side elevational view of two mounting plates of the FIG. 5 embodiment coupled together for joining two threaded pipes or tubes.

FIG. 7 is a side elevational view of the mounting plates of FIG. 6 with two pipes coupled together.

FIGS. 8 and 9 are perspective showings of two additional alternate embodiments of the invention.

The same reference numerals refer to the same parts throughout the various Figures.

DESCRIPTION OF THE PREFERRED EMBODIMENT

Figure 1:
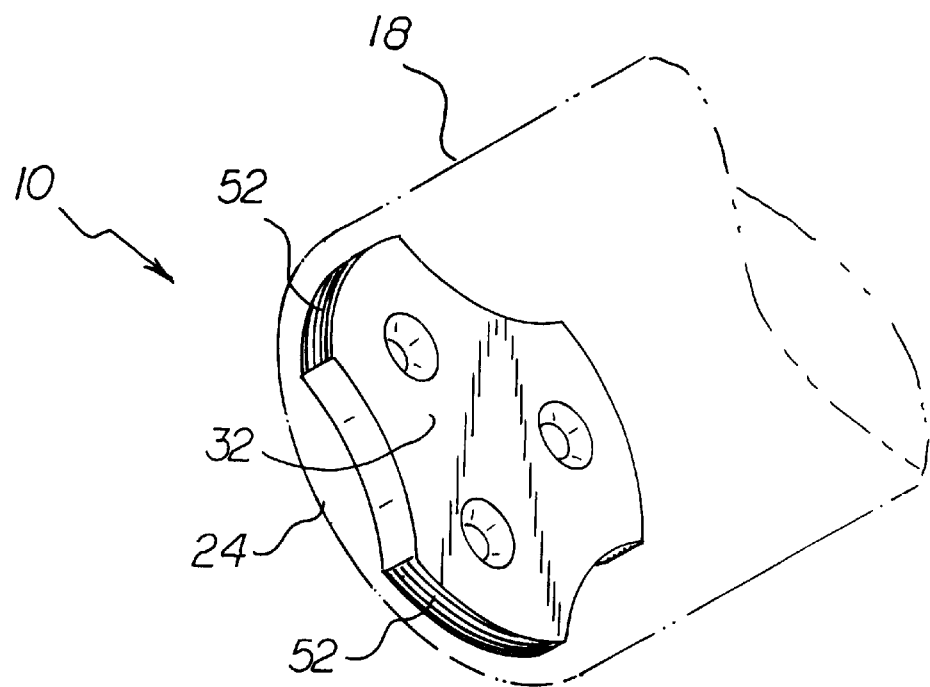
FIG. 1 is a perspective showing of a mounting system constructed in accordance with the principles of the present invention.
Figure 2:
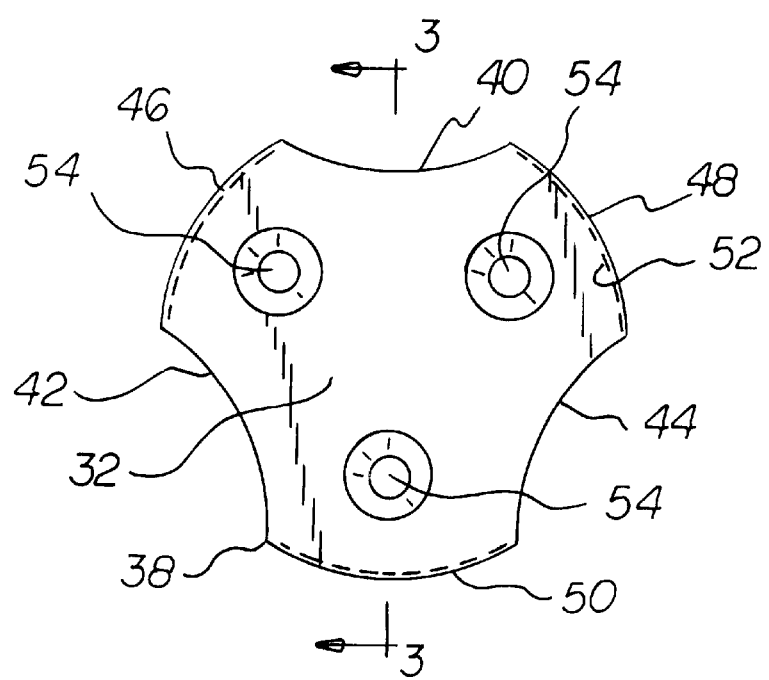
FIG. 2 is a front elevational view the mounting plate shown in FIG. 1.
Figure 9:
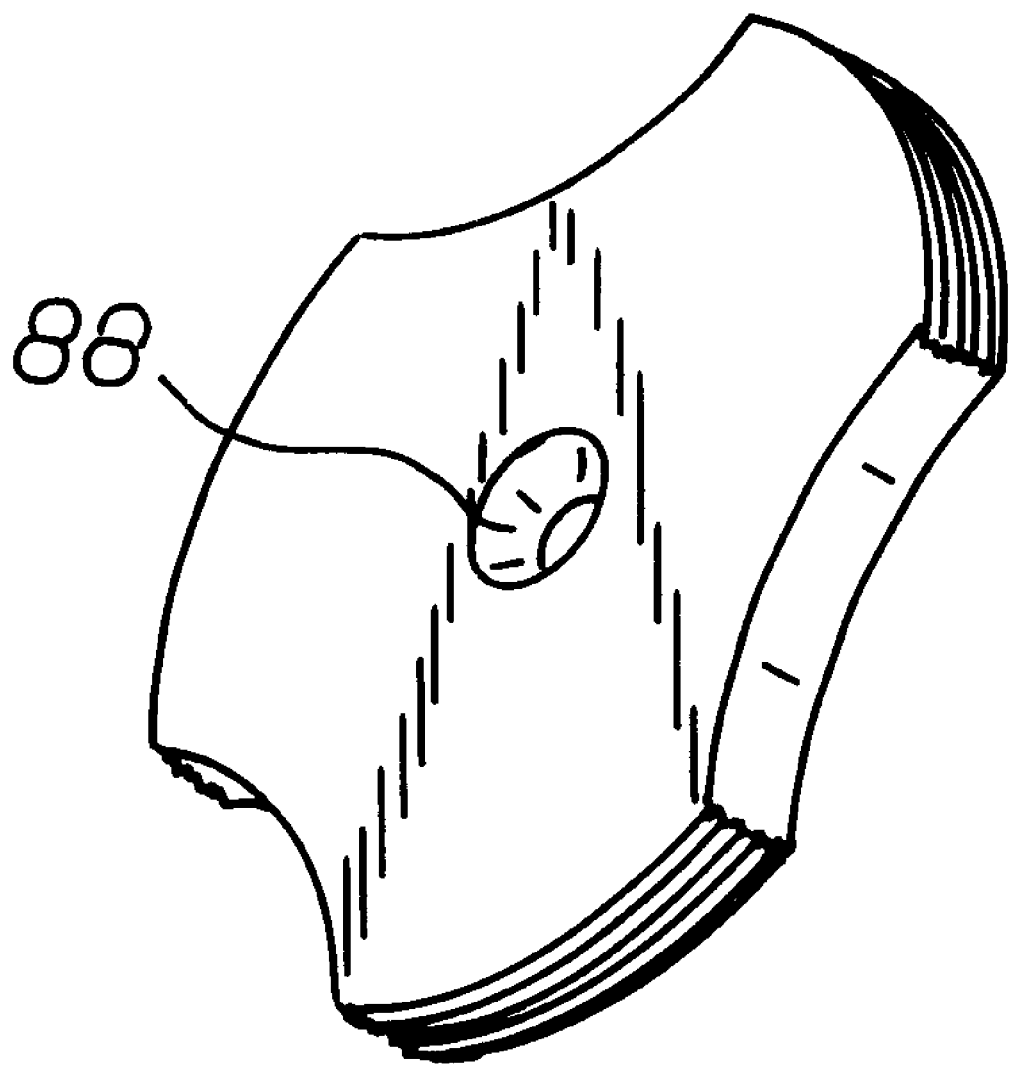

With reference now to the drawings, and in particular to FIG. 1 thereof, the preferred embodiment of the new and improved mounting system embodying the principles and concepts of the present invention and generally designated by the reference numeral 10 will be described.

The present invention, the mounting system 10 is comprised of a plurality of components. Such components in their broadest context include a generally cylindrical mounting plate and at least one hole though the mounting plate. Such components are individually configured and correlated with respect to each other so as to attain the desired objective.

First provided is a vertically oriented, rigid, planar, recipient surface 14.

A cylindrical member 18 is next provided. The cylindrical member has an interior surface 20 and an exterior surface 22. The cylindrical member further has a first end 24. The first end has a first edge 26. The first end also has female threads 28. The female threads are formed in the interior surface adjacent to the first edge.

A mounting plate 32 is provided next. The mounting plate has an interior face 34 and an exterior face 36. The mounting plate has a generally cylindrical, thin, outer circumference 38. The circumference of the mounting plate has three arcuate concave regions 40, 42, 44. Each region is about 60 degrees, equally spaced around the circumference. The circumference of the mounting plate has three arcuate convex regions 46, 48, 50. Each region is about 60 degrees, equally spaced around the circumference between the concave regions. The convex regions each have male threads 52. The male threads are adapted to releasably couple to the threads of the cylindrical member. The mounting plate further has a central extent with three beveled holes 54 symmetrically located adjacent to the circumference in proximity to the convex regions. The beveled holes have a large aperture 56 opening in the exterior face of the mounting plate and a small aperture 58 opening into the interior face of the mounting plate. The interior face is adapted to lie flush with the recipient surface. One of the three concave regions is adapted to be positioned at the upper most extent of the recipient surface. In this manner the adjacent edges of the convex regions lie laterally spaced when coupled to the planar surface such that their adjacent edges lie in a horizontal plane for supporting a level.

Provided last are three set screws 62. The screws have a pointed end 64 and a head end 66. The screws also have a flared top portion. The flared top portion has a coupling recess 68 and male threads 70 there between. The screws are adapted to threadedly couple through the mounting plate into the recipient surface. In this manner the pointed end and threads pierce the planar surface and the head end lies within the beveled holes with the flared top portion lying flush with the top face of the mounting plate. The mounting plate may then threadedly receive and support the cylindrical member.

In an alternate embodiment of the present invention the system further includes a recipient surface of concrete 74.

In another alternate embodiment of the present invention the system further includes a recipient surface of wall board 76 and a stud 78.

In another alternate embodiment of the present invention the hole of the system includes three cylindrical holes symmetrically located adjacent to the circumference in proximity to the convex regions with bolts 80 and nuts 82 holding two mounting plates together for threadedly receiving and supporting two internally threaded cylindrical members end to end in axial alignment.

In still another alternate embodiment of the present invention the hole of the system includes three beveled holes 84. The beveled holes are symmetrically located adjacent to the circumference in proximity to the convex regions. One cylindrical hole 86 is located in the center of the mounting plate.

In the last alternate embodiment of the present invention the hole of the system includes one beveled hole 88 located in the center of the mounting plate.

The mounting plate as well as the threaded cylindrical member are fabricated of a rigid material, preferably metal such as stainless steel. A wide range of other metals could also be utilized. In addition, these rigid parts could also be fabricated of a rigid plastic material, polyvinyl chloride (PVC), for example. The choice of materials is a function of the particular application.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mounting system adapted for coupling internally threaded cylindrical members including rods, pipes and tubes to flat surfaces and to each other comprising, in combination;

a vertically oriented, rigid, planar, recipient surface;

a cylindrical member having an interior surface and an exterior surface, the cylindrical member further having a first end with a first edge and female threads formed in the interior surface adjacent to the first edge;

a mounting plate having an interior face and an exterior face with the mounting plate having a generally cylindrical, thin, outer circumference, the circumference of the mounting plate having three arcuate concave regions, each about 60 degrees, equally spaced around the circumference, the circumference of the mounting plate having three arcuate convex regions, each about 60 degrees, equally spaced around the circumference between the concave regions, the convex regions each having male threads adapted to releasably couple to the threads of the cylindrical member, the mounting plate further having central extent with three beveled holes symmetrically located adjacent to the circumference in proximity to the convex regions, the beveled holes having a large aperture opening in the exterior face of the mounting plate and a small aperture opening into the interior face of the mounting plate, the interior face being adapted to lie flush with the recipient surface, one of the three concave regions being adapted to be positioned at the upper most extent of the recipient surface whereby adjacent edges of the convex regions lie laterally spaced when coupled to the planar surface such that their adjacent edges lie in a horizontal plane for supporting a level; and three set screws having a pointed end and a head end with a flared top portion with a coupling recess and male threads there between, the screws being adapted to threadedly couple through the mounting plate into the recipient surface such that the pointed end and threads pierce the planar surface and the head end lies within the beveled holes with the flared top portion lying flush with the top face of the mounting plate so that the mounting plate may threadedly receive and support the cylindrical member.

2. A mounting system comprising:

a generally cylindrical mounting plate having an outer circumference with a plurality of concave regions and a plurality of convex regions between the concave regions, the convex regions each having male threads adapted to releasably couple to the internal threads of a cylindrical member; and at least one hole through the mounting plate.

3. The system as set forth in claim 2 wherein the hole includes three beveled holes symmetrically located adjacent to the circumference in proximity to the convex regions, the beveled holes each having a large aperture with a fustroconical extent and a small aperture adapted to lie flush with a recipient surface and three set screws having a pointed end and a head end with a flared top portion with a coupling recess and male threads there between, the screws being adapted to threadedly couple through the mounting plate into a recipient surface such that the pointed end and threads may pierce the planar surface and the head end lies within the beveled holes with the flared top portion lying flush with the top face of the mounting plate so that the mounting plate may threadedly receive and support the cylindrical member.

4. The system as set forth in claim 2 and further including a recipient surface of concrete.

5. The system as set forth in claim 2 and further including a recipient surface of wall board and a stud.

6. The system as set forth in claim 2 wherein the hole includes three cylindrical holes symmetrically located adjacent to the circumference in proximity to the convex regions with bolts and nuts holding two mounting plates together for threadedly receiving and supporting two internally threaded cylindrical members end to end in axial alignment.

7. The system as set forth in claim 2 wherein the hole includes three beveled holes symmetrically located adjacent to the circumference in proximity to the convex regions and one cylindrical hole located in the center of the mounting plate.

8. The system as set forth in claim 2 wherein the hole includes one beveled hole located in the center of the mounting plate.

* * * * *